(12) United States Patent
Kim (10) Patent No.: US 10,999,981 B2
(45) Date of Patent: May 11, 2021

(54) ONION GROWING METHOD

(71) Applicant: Dohye Kim, Chungcheongnam-do (KR)

(72) Inventor: Dohye Kim, Chungcheongnam-do (KR)

( * ) Notice: Subject to any disclaimer, the term of this patent is extended or adjusted under 35 U.S.C. 154(b) by 263 days.

(21) Appl. No.: 16/302,598

(22) PCT Filed: May 12, 2017

(86) PCT No.: PCT/KR2017/004971
§ 371 (c)(1),
(2) Date: Nov. 16, 2018

(87) PCT Pub. No.: WO2017/200241
PCT Pub. Date: Nov. 23, 2017

(65) Prior Publication Data
US 2019/0289800 A1    Sep. 26, 2019

(30) Foreign Application Priority Data

May 16, 2016    (KR) .................. 10-2016-0059403

(51) Int. Cl.
*A01G 22/35* (2018.01)
*A01C 14/00* (2006.01)
*A01D 31/00* (2006.01)
*A01G 2/00* (2018.01)
*A01C 1/02* (2006.01)
*A01C 11/02* (2006.01)

(52) U.S. Cl.
CPC ............... *A01G 22/35* (2018.02); *A01C 1/02* (2013.01); *A01C 11/02* (2013.01); *A01C 14/00* (2013.01); *A01D 31/00* (2013.01); *A01G 2/00* (2018.02)

(58) Field of Classification Search
CPC . A01G 22/35; A01G 2/00; A01G 7/00; A01C 1/00; A01C 1/02
See application file for complete search history.

(56) References Cited

U.S. PATENT DOCUMENTS

| | | | | |
|---|---|---|---|---|
| 5,232,465 A | * | 8/1993 | White | A01C 1/02 47/58.1 R |
| 5,913,729 A | * | 6/1999 | Kajimura | A01G 2/00 47/58.1 R |
| 2015/0230462 A1 | * | 8/2015 | Scheer | A01N 37/42 504/100 |
| 2020/0260667 A1 | * | 8/2020 | Oh | F25D 23/003 |

FOREIGN PATENT DOCUMENTS

| | | |
|---|---|---|
| JP | 2003180164 A | 7/2003 |
| JP | 2012010652 A | 1/2012 |

\* cited by examiner

*Primary Examiner* — Trinh T Nguyen
(74) *Attorney, Agent, or Firm* — Renaissance IP Law Group LLP (57) ABSTRACT

The present disclosure relates to an onion growing method, and more particularly, to an onion growing method that includes the steps of: (a) allowing onions to be dormant; (b) breaking the dormancy of the onions; (c) planting the onions of which dormancy is broken in a field; (d) growing the planted onions to produce a plurality of stems and bulbs divided from the respective onions; and (e) harvesting the plurality of stems and bulbs. According to the present disclosure, the onion growing method does not have any limitation in growth time unlike a conventional onion growing method, reduces a period of growth, and drastically increasing onion yield to raise a farmer's profits. Also, the onion growing method stably supplies onion stems and leaves, thereby providing various profits through onions.

10 Claims, 9 Drawing Sheets

ONION GROWING METHOD

TECHNICAL FIELD

The present disclosure relates to an onion growing method, and more particularly, to an onion growing method that plants onions of which dormancy is broken in a field and grows the onions, thereby having a shorter period of growth than onions through seed sowing, achieving high yield, and providing easy utilization as leaf vegetables.

BACKGROUND ART

Onions as condiment vegetables have long cultivation history and are cultivated in substantially large areas every year. The onions are one of principal vegetables in dietary life, together with garlic, green onions, and red pepper. Since the onions as cold-resistance vegetables grow in various weather conditions, they are cultivated in almost the entire world. According to long historical records, also, the onions have been eaten with spices.

The onions serve to remove smell from meat or fish through their strong smell and flavor. The strong smell is caused by tens of flavonoids such as allyl propyl disulfide and allyl sulfide, and through such components, the onions have excellent antimicrobial effects, heavy metal detoxification, serum cholesterol reduction, anti-atherosclerosis effects, anti-hypertension effects, anti-diabetic effects, carcinogen activation reduction, enzyme inhibition of cancer cells, activation increment of anti-cancer materials, and variation cancer cell growth inhibition.

The onions are largely divided into sweet onions having mild flavor and chili onions having strong flavor, and they are also divided into yellow, red, white onions. The sweet onions are used for eating, without any cooking, and the chili onions are used for cooking. Most of onion species cultivated in Korea are yellow chili onions used for boiling meat or vegetables while mixed and also used as ingredients of food like curry rice.

According to Korean medical book, Donguibogam, further, the onions help meridian Gi of five visceras of the human body, and they are vegetables used in traditional folk remedies from a long time ago. A raw onion has a content of quercetin of 16 to 42 mg/100 g as a chemical component good to the human body, and the quercetin serves to dissolve fat and cholesterol unnecessary in blood, thereby preventing atherosclerosis and hyperlipidemia, lowering a blood pressure, and decreasing blood sugar.

On the other hand, onion seeds are sown from end-August to early-September, and onion seedlings are planted in a field in mid-October. The onions are harvested between May and June next year. One bulb per seed, that is, one onion is cultivated, thereby having a limitation in yield. Undesirably, the period of cultivation is long, and the cultivation time is also restricted. Moreover, the onion seeds depend upon import, and the seed prices are relatively expensive.

The stems and leaves of the onions are sweet and have good flavors, and accordingly, they are harvested for a limited time in March. In this case, their yield and cultivation time are limited, thereby making it hard to stably supply the stems and leaves of the onions.

As prior art documents related to an onion growing method, on the other hand, there have been proposed a method for cultivating onion for onion kimchi as disclosed in Korean Patent No. 10-0893384 and an onion with high calcium and a method for cultivating the same as disclosed in Korean Patent No. 10-0842360. According to the prior art documents, the functionality of the onions cultivated is improved or the merchantability of the onions is enhanced. However, they fail to raise the yield of the onions or to reduce the period of cultivation of the onions.

PRIOR ART DOCUMENTS

Patent Documents (Patent Document 0001) KR 10-0893383 B1
(Patent Document 0002) KR 10-0842360 B1

DISCLOSURE

Technical Problem

Accordingly, the present disclosure has been made to solve the above-mentioned problems, and it is an object of the present disclosure to provide an onion growing method that plants onions of which dormancy in a field and grows the onions, thereby reducing a period of growth, and divides a plurality of bulbs from the respective onions, thereby drastically increasing onion yield.

It is another object of the present disclosure to provide an onion growing method that is capable of growing onions, irrespective of a period of sowing, because seeds are not sown, thereby obtaining a variety of periods of time for harvesting onion stems and leaves, drastically increasing their yield, and making it possible to stably supply the onion stems and leaves.

Technical Solution

To accomplish the above-mentioned objects, according to the present disclosure, there is provided an onion growing method including the steps of: (a) allowing onions to be dormant; (b) breaking the dormancy of the onions; (c) planting the onions of which dormancy is broken in a field; (d) growing the planted onions to produce a plurality of stems and bulbs divided from the respective onions; and (e) harvesting the plurality of stems and bulbs.

According to the present disclosure, desirably, at the step of (a), the onions are cultivated by sowing onion seeds to seedbeds, germinating the sown seeds, planting the germinated seedlings in the field, and growing the planted onion seedlings.

According to the present disclosure, desirably, the step of (a) allowing onions to be dormant is carried out by storing the onions at a temperature of 0 to 5° C.

According to the present disclosure, desirably, the step of (b) breaking the dormancy of the onions is carried out by storing the dormant onions at a temperature of 25 to 35° C. for 5 to 20 days.

According to the present disclosure, desirably, the step of (d) growing the planted onions to produce a plurality of stems and bulbs divided from the respective onions is carried out by growing the onions for 30 to 60 days and dividing 5 to 15 onion stems and bulbs from the respective onions.

Advantageous Effects

According to the present disclosure, the onion growing method does not have any limitation in growth time unlike a conventional onion growing method, reduces a period of growth, and drastically increasing onion yield to raise a farmer's profits.

According to the present disclosure, the onion growing method stably supplies onion stems and leaves, thereby providing various profits through onions.

MODE FOR INVENTION

Hereinafter, the present disclosure will be in detail explained with reference to the attached drawing.

In conventional practices, an onion growing method largely includes the steps of sowing and germinating onion seeds and planting and growing the germinated seedlings in a field. By the way, onion sowing time is limited from end-August to early-September, and it is inconvenient to plant the seedlings in the field again. Of course, only one bulb per seedling is produced, thereby failing to obtain high yield.

In addition, onion stems and leaves have excellent sugar content, taste, and texture, so that they become widely utilized as leaf vegetables. According to the conventional onion growing method, however, it is hard to stably supply the onion stems and leaves, and accordingly, the onion stems and leaves have been considered as products having poor marketability.

So as to remove the disadvantages the conventional onion growing method have had, accordingly, an onion growing method according to the present disclosure drastically increases the yield of onions and onion stems (including leaves) and achieves non-limitation in growing time and year-round production.

According to the present disclosure, the onion growing method includes the steps of (a) allowing onions to be dormant; (b) breaking the dormancy of the onions; (c) planting the onions of which dormancy is broken in a field; (d) growing the planted onions to produce a plurality of stems and bulbs divided from the respective onions; and (e) harvesting the plurality of stems and bulbs.

Hereinafter, an explanation on the onion growing method according to the present disclosure will be in detail given according to the above-mentioned steps.

(a) Allowing Onions to be Dormant

First, onions are allowed to be dormant.

The dormancy is a period of a plant when development or growth is temporarily stopped, and onions start to be elongated at a temperature of 5 to 21° C. and their growth is accelerated at a temperature of 21 to 27° C., so that if the onions are stored at a temperature of 0 to 5° C., their development or growth is stopped.

According to the present disclosure, in detail, the onions are stored at a temperature of 0 to 5° C., in a state where no light exists, and if the storage temperature is less than 0° C., undesirably, the onions become frozen.

Of course, it is possible to allow the onions to be dormant only in a state where they are stored at a room temperature in a rain roof facility, not in a separate cold storage room, according to harvest time.

At this time, the onions to be dormant are just onions cultivated according to the conventional method wherein onion seeds are sown and germinated in seedbeds and the germinated seedlings are planted, cultivated and harvested. Moreover, the onions to be dormant are of course onions cultivated according to the present disclosure, and therefore, they are not limited in kinds.

(b) Breaking the Dormancy of the Onions

Next, the dormancy of the onions is broken. The dormancy breaking activates the growth of the onions again, and so as to allow the onions to actively grow, accordingly, the onions are stored at a temperature of 25 to 35° C. for 5 to 20 days. If the storage temperature is high, at this time, the growth becomes rapidly accelerated to reduce the period of storage, and contrarily, if the storage temperature is low, the period of storage is extended to allow the dormancy to be sufficiently broken.

So as to break the dormancy of the onions, moreover, light is needed, and therefore, it is important to allow the sunlight to come into well.

Further, it is possible to break the dormancy of the onions through application of high temperature steam more than 40° C. to the dormant onions, and otherwise, the dormancy of the onions is broken through just drawing from a cold storage room, not through any separate storage or treatment. Accordingly, the onions drawn from the cold storage room are planted, and thus, their dormancy is broken in the field.

If the onions are stored simply at the room temperature in the rain roof facility, further, they are planted in the field, and thus, their dormancy is broken.

(c) Planting the Onions of which Dormancy is Broken in a Field

Figure 1:
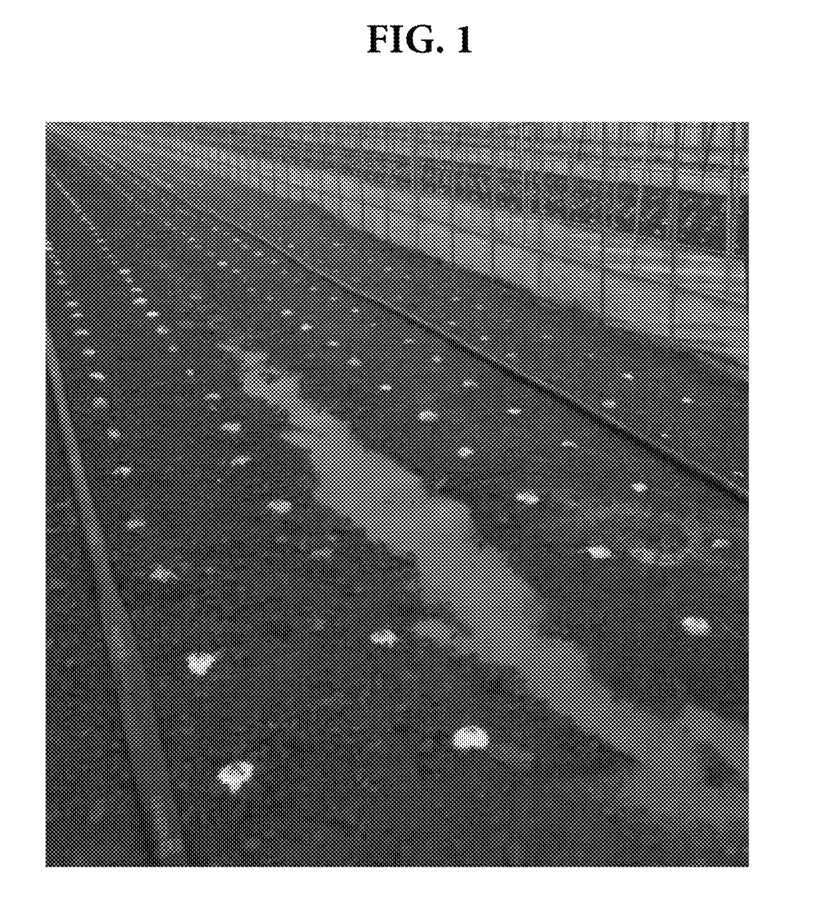
FIG. 1 is a photograph showing an onion growing method according to the present disclosure wherein onions of which dormancy is broken are planted in a field.

If the onions of which dormancy is broken are prepared, they are planted in the field. In detail, the onions are just planted in the field. FIG. 1 is a photograph showing the onion growing method according to the present disclosure wherein onions of which dormancy is broken are planted in a field. As shown in FIG. 1, the planted onions are not entirely covered with soil, but they are planted in such a manner as to be exposed by $\frac{1}{10}$ to $\frac{1}{2}$ of their height to the outside, so that they can sprout more rapidly.

In this case, the field is desirably formed of sandy soil, clay soil, and so on, but it is not limited thereto. Of course, it is necessary to apply matured compost or a gardening complex fertilizer to the field before planting and to evenly mix soil with the applied compost or fertilizer. Since the onions are root vegetables, of course, compost made by mixing rice bran and ash having phosphoric acid and potassium may be applied to the field.

The method for planting the onions in the field except the above-mentioned processes is the same as the method for planting the seedlings in the field in the conventional practice. For example, ridges each having a width of 0.8 to 1 m and a height of 5 to 10 cm are made on the field digged with the compost applied thereto, and a valley onto which the onions of which dormancy is broken are planted is formed on each ridge. After that, the onions of which dormancy is broken are spaced apart from each other at intervals of a horizontal length of 15 to 30 cm and a vertical length of 15 to 30 cm, and sides of the onions are covered one by one with soil. If necessary, further, the onions are covered with perforated vinyl, and through installation of irrigation equipment, losses of the onions are prevented on rainy days.

Figure 2:
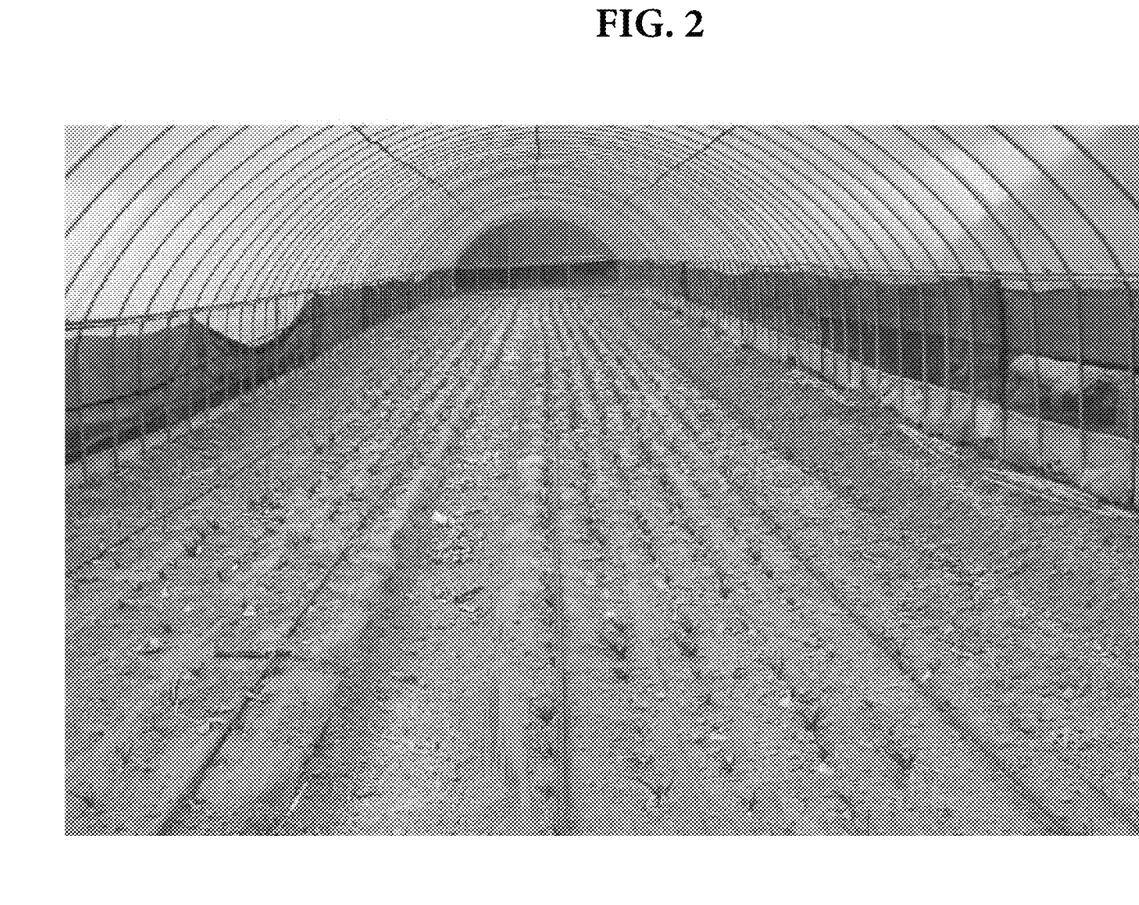
FIG. 2 is a photograph showing the onion growing method according to the present disclosure wherein the planted onions sprout.

(d) Growing the Planted Onions to Produce a Plurality of Stems and Bulbs Divided from the Respective Onions Next, the planted onions grow to sprout. FIG. 2 is a photograph showing the onion growing method according to the present disclosure wherein the planted onions sprout. In the same manner as the conventional method for growing onions, at this time, compost and water are sufficiently supplied to the planted onions at given intervals to allow the onions to grow.

Figure 3:
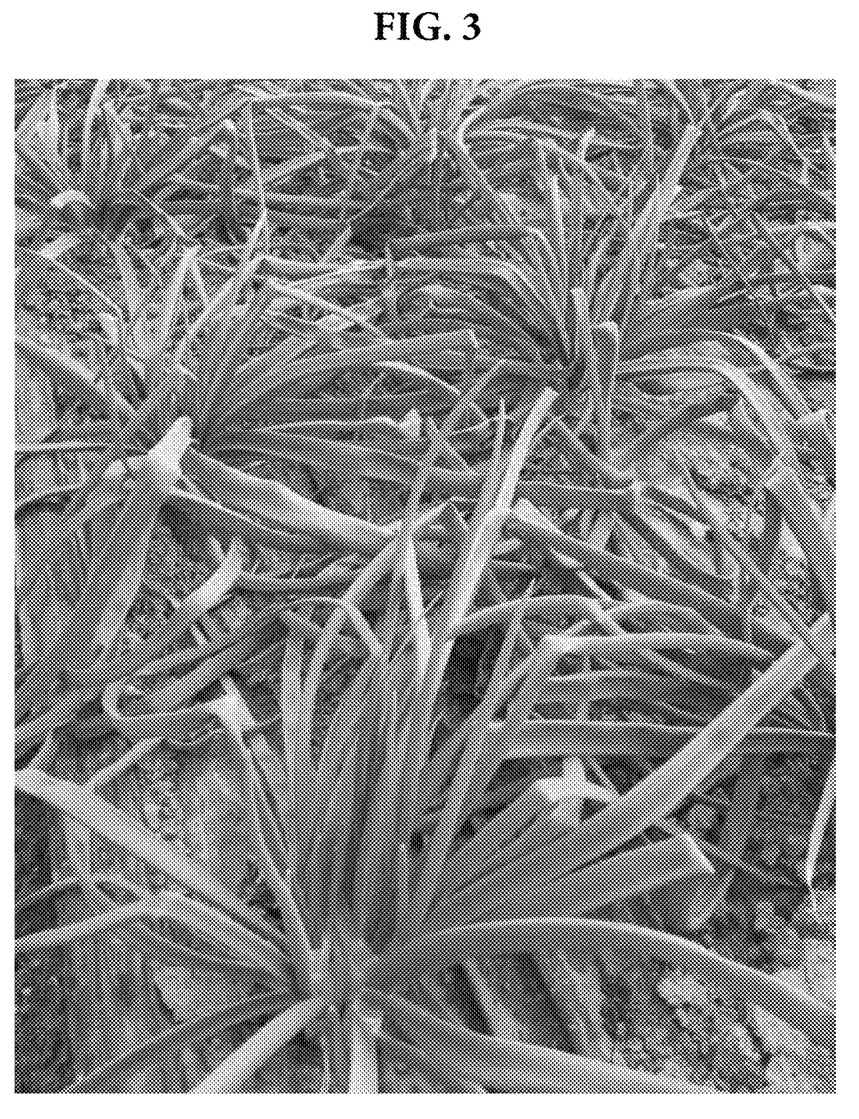
FIGS. 3 and 4 are photographs showing the onion growing method according to the present disclosure wherein a plurality of onion stems and bulbs are divided from the respective onions.
Figure 4:
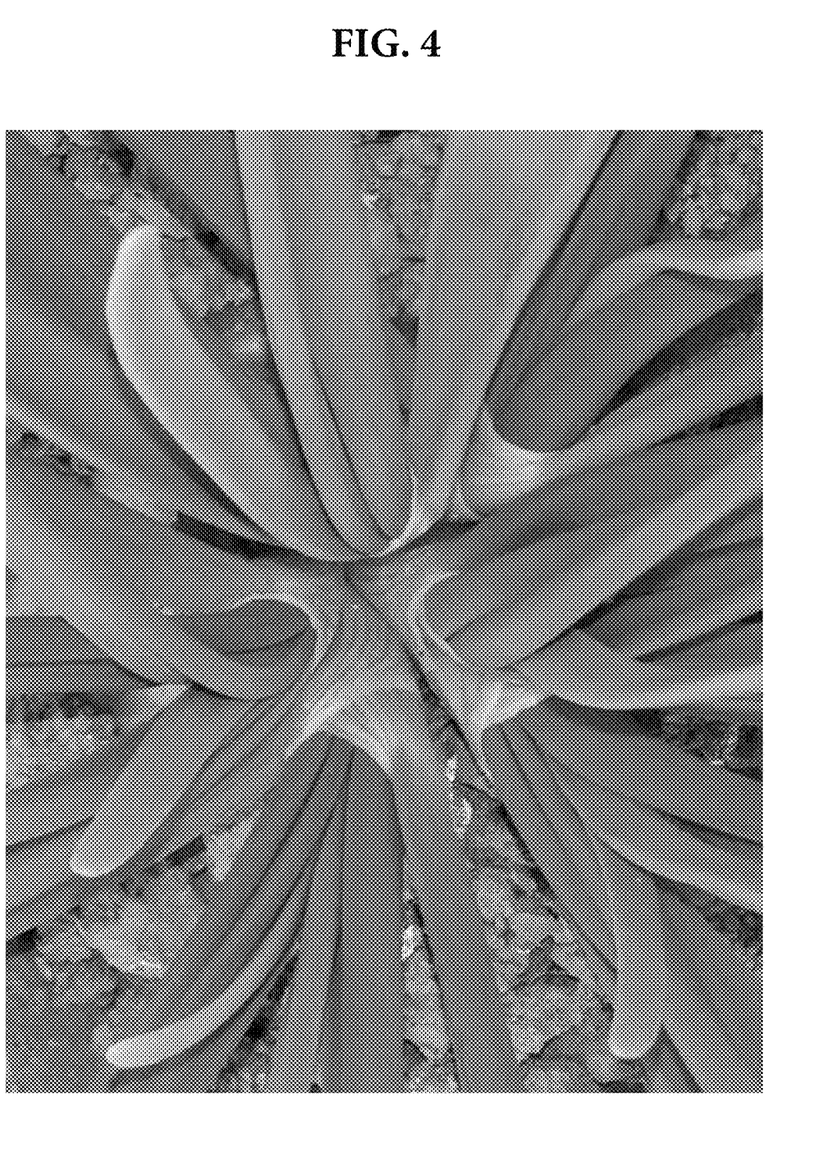

If the onions sprouted are kept to grow, bulbs are produced. That is, a plurality of onion stems and bulbs, generally, 5 to 10 onion stems and bulbs are divided from the respective onions. If the onions continuously grow, the onion stems and bulbs become enlarged, and if a period of 30 to 60 days is elapsed, the onion stems and bulbs grow to a harvest size. FIG. 3 is a photograph showing the onion stems and bulbs divided from the respective onions, and even though the bulbs are not shown, they are produced downward from the stems. FIG. 4 is a photograph showing one enlarged onion from the onions shown in FIG. 3.

(e) Harvesting the Plurality of Stems and Bulbs

Next, the stems and bulbs sufficiently grown after divided from the respective onions are harvested.

The period of harvest is desirably a time point after 30 to 60 days after the onions have been planted. In detail, growth is sufficiently completed for 30 to 40 days in summer during which the onions rapidly grow by means of high temperature, growth is sufficiently completed for 50 to 60 days in winter during which the onions slowly grow by means of low temperature, and growth is sufficiently completed for 40 to 50 days in spring and fall.

Figure 5:
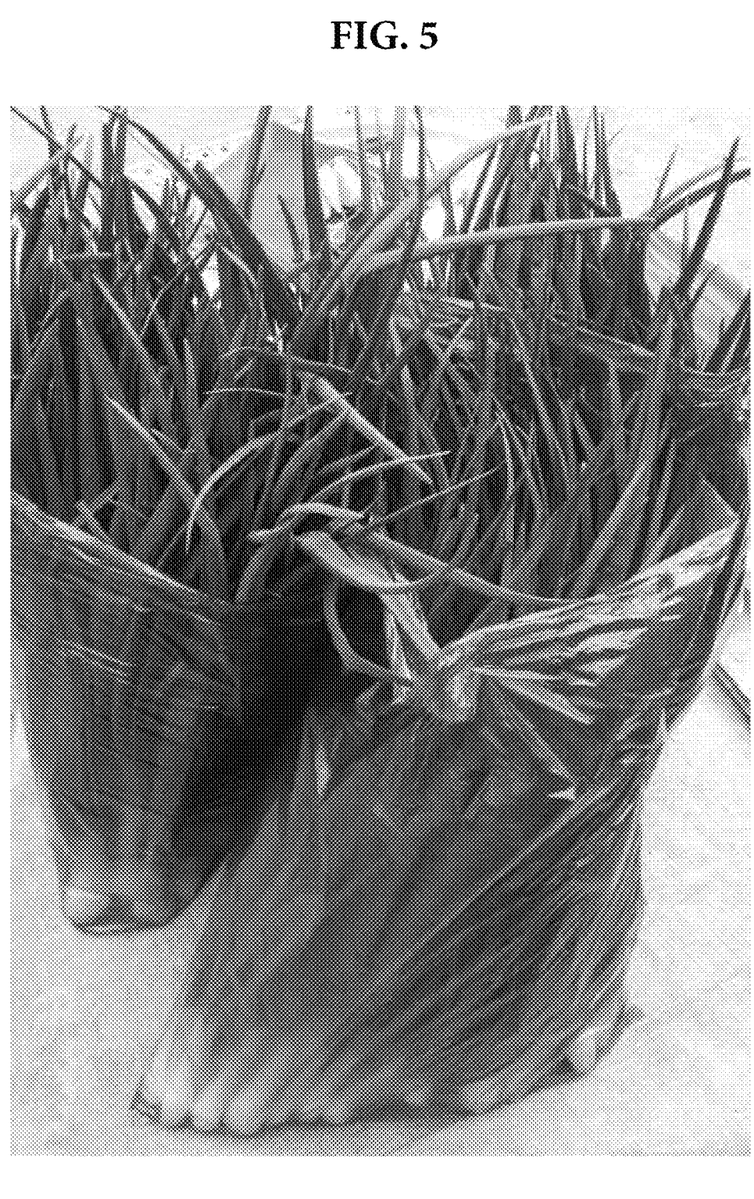
FIGS. 5 to 9 are photographs showing various shapes of onion stems and bulbs according to harvest time.
Figure 6:
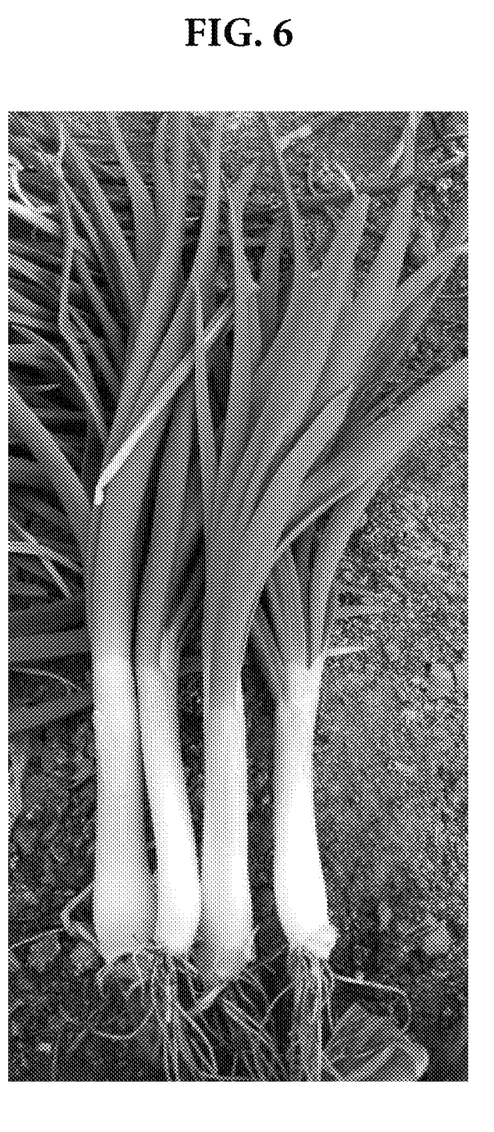
Figure 7:
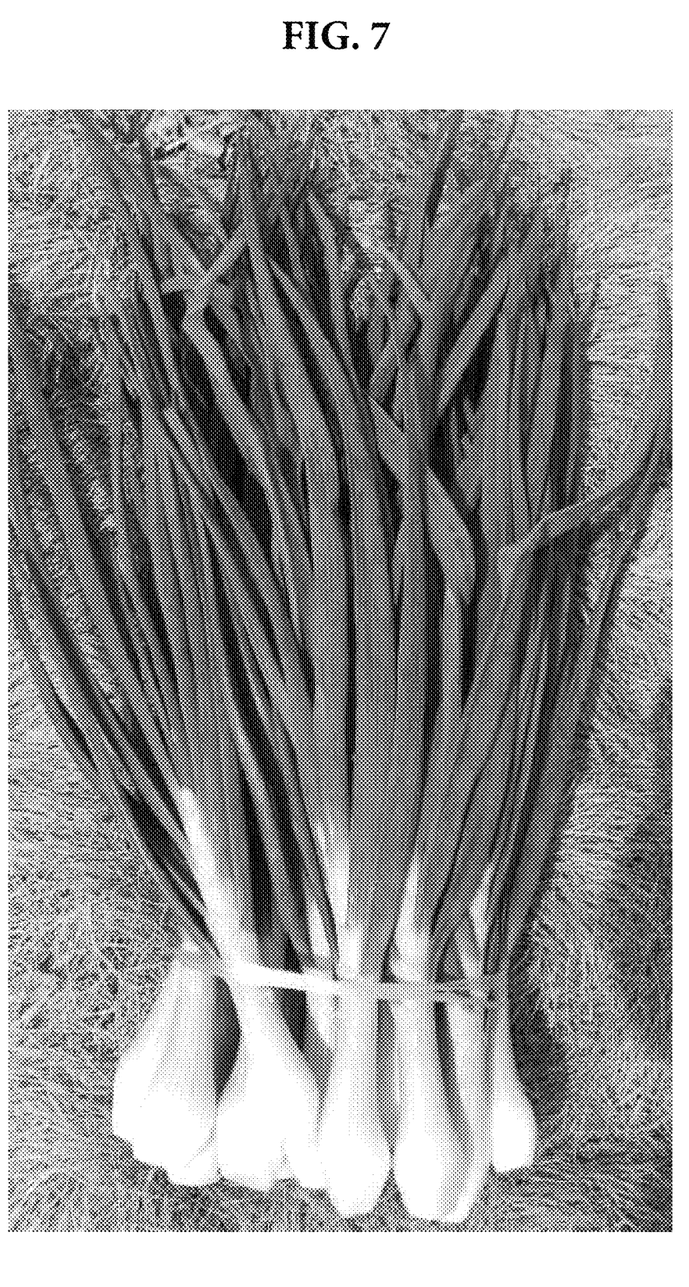
Figure 8:
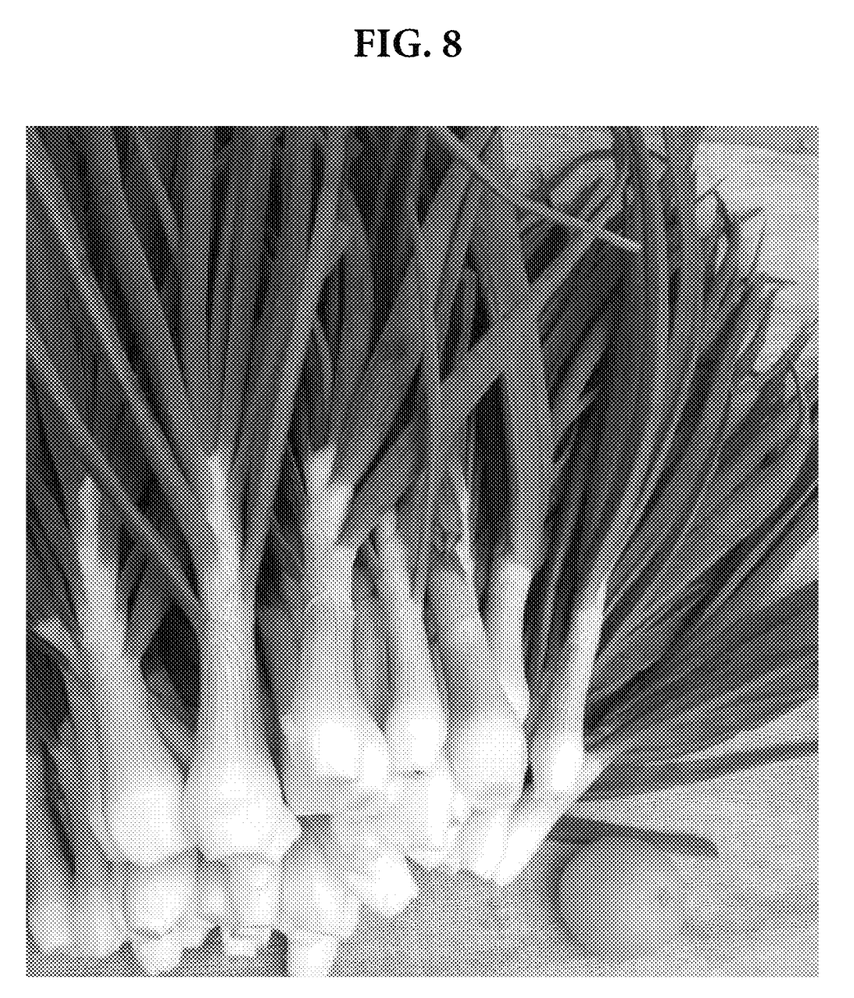
Figure 9:
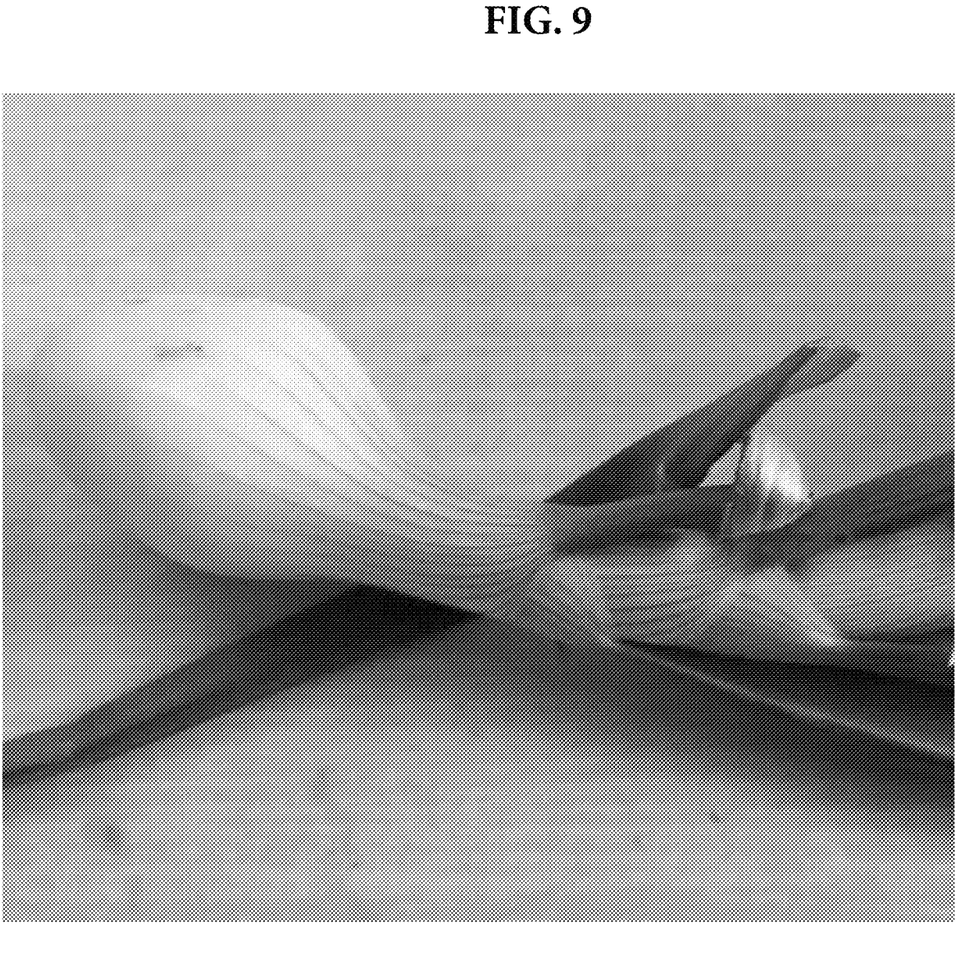

If the divided onion stems and bulbs are harvested rapidly, that is, at the early stage, they have a shape of spring onions as shown in FIG. 5. If they are harvested at the middle stage, on the other hand, they have a shape of green onions as shown in FIGS. 6 and 7, and if they are harvested at the late stage, they have a shape of onions having stems as shown in FIGS. 8 and 9.

The stems and bulbs of the onions cultivated according to the present disclosure can be harvested to the shapes of spring onions, green onions, and onions according to the periods of harvest. Accordingly, the onion growing method according to the present disclosure can drastically increase conventional onion yield and can be utilized as leaf vegetables replacing spring onions and green onions. Also, the supply of the onions can be stably performed to achieve high marketability.

Moreover, stems and bulbs of about 3 to 5 kg are produced from one onion, and rapid and simple growth are carried out, thereby drastically improving profits of farmers and of course making it possible to perform stable year-around production.

On the other hand, the onion growing method according to the present disclosure may be carried out through facility growth or open-field growth, without any limitation.

Now, the onion growing method according to the present disclosure will be in detail explained by way of various embodiments.

First Embodiment

Onion seeds were sown to grow onions, and the grown onions were stored in a cold storage room having a temperature of 0° C. for one month in such a manner as to become dormant. Next, the onions were stored at a temperature of 25° C. for 15 days in such a manner as to break the dormancy of the onions, and the onions of which dormancy was broken were planted in a field and then cultivated. The onions were grown in a facility, and a cultivation temperature was daily average 20° C.

Compost and water during cultivation were sufficiently supplied to the onions according to the conventional onion growing method.

Second Embodiment

The second embodiment was carried out in the same manner as the first embodiment, except that the grown onions were stored in a cold storage room having a temperature of 5° C. for one month in such a manner as to become dormant.

Third Embodiment

The third embodiment was carried out in the same manner as the first embodiment, except that the grown onions were stored at a temperature of 35° C. for five days in such a manner as to become dormant.

Fourth Embodiment

The fourth embodiment was carried out in the same manner as the first embodiment, except that the grown onions were stored in a cold storage room having a temperature of 0° C. for one month in such a manner as to become dormant and they were planted in a field to allow the dormancy to be broken.

Comparison Example 1

Onion seeds were sown to grow onion seedlings, and the onion seedlings were planted in a field. Next, they were cultivated.

Example 1

After the onions were cultivated for 30 to 50 days according to the first to fourth embodiments, their yield, an average length of stems, and an average diameter of bulbs per one onion planted were measured according to periods of harvest. The measured results are provided in Table 1.

TABLE 1

| Division | | Yield (g) | Average length of stem (cm) | Average diameter of bulb (cm) |
| --- | --- | --- | --- | --- |
| First embodiment | 30 days | 2541 | 71 | 3.1 |
| | 40 days | 3241 | 87 | 5.3 |
| | 50 days | 4126 | 98 | 7.2 |
| Second embodiment | 30 days | 2351 | 69 | 3.3 |
| | 40 days | 3025 | 82 | 5.5 |
| | 50 days | 3891 | 93 | 7.9 |
| Third embodiment | 30 days | 2534 | 72 | 3.5 |
| | 40 days | 3532 | 80 | 5.2 |
| | 50 days | 4052 | 91 | 7.3 |

Table 1 shows the results of the Example 1, and it can be appreciated from Table 1 that as the period of cultivation becomes long, the yield, the average length of the stem, and the average diameter of the bulb are increased. In detail, the onions harvested after 30 days have sizes between medium-sized onions and green onions, without any bulbs, the onions harvested after 45 days have small-sized bulbs, and the onions harvested after 60 days have bulbs corresponding to the conventional small onions.

According to the comparison Example 1, moreover, it is hard to harvest both of the stems and bulbs of the onions through only the cultivation of 50 days.

Example 2

The bulb of the onion harvested after 50 days according to the first embodiment of the present disclosure was cut off to a size of about 2 cm×2 cm×2 cm, and the stem thereof was cut off to a size of 1 cm×2 cm.

As control of Example 2, an onion and a green onion harvested according to the general cultivation method and purchased on a market were cut off to the same size as the Embodiment 1 of the present disclosure.

Sensory evaluation was carried out with panels consisting of 20 adult men and 20 adult women to estimate taste, texture, outer shape, flavor and total preference through 9-point rating scale (wherein 9: very good, 7: good, 5: not bad, 3: bad, and 1: very bad), and the estimation results are listed in Table 2.

TABLE 2

| Division | | Taste | Texture | Outer shape | Flavor | Total preference |
|---|---|---|---|---|---|---|
| First embodiment | Bulb | 5.2 | 5.1 | 4.5 | 5.0 | 5.6 |
| | Stem | 6.2 | 5.9 | 4.2 | 5.1 | 5.7 |
| Control | Onion | 5.2 | 5.0 | 4.3 | 5.0 | 5.6 |
| | Green onion | 4.1 | 4.2 | 4.0 | 4.1 | 4.1 |

Table 2 shows the results of Example 2, and it can be appreciated from Table 2 that the onion bulb of the first embodiment of the present disclosure shows the levels of the taste, texture, outer shape, flavor and total preference similar to those in the control and the onion stem of the first embodiment of the present disclosure shows higher levels of the taste, texture, outer shape, flavor and total preference than the green onion of the control.

Accordingly, the onion growing method according to the present disclosure provides the onion bulbs having the same taste as the conventional onion bulbs even though the yield is drastically increased and also provides leaf vegetables having higher sensory properties than the conventional green onions.

While the present disclosure has been described with reference to the particular illustrative embodiments, it is not to be restricted by the embodiments but only by the appended claims. It is to be appreciated that those skilled in the art can change or modify the embodiments without departing from the scope and spirit of the present disclosure.

The invention claimed is:

1. An onion growing method comprising the steps of:
   (a) allowing onions to be dormant;
   (b) breaking the dormancy of the onions;
   (c) planting the onions of which dormancy is broken in a field;
   (d) growing the planted onions to produce a plurality of stems and bulbs divided from the respective onions; and
   (e) harvesting the plurality of stems and bulbs,
   wherein allowing onions to be dormant is carried out by storing the onions at a temperature of 0 to 5° C.;
   wherein breaking the dormancy of the onions is further carried out by planting the dormant onions in a field, and wherein, in planting the dormant onions in the field, the dormant onions are planted in such a manner as to be exposed by 1/10 to 1/2 of their height to the outside.

2. The onion growing method according to claim 1, wherein at the step of (a), the onions are cultivated by sowing onion seeds to seedbeds, germinating the sown seeds, planting the germinated seedlings in the field, and growing the planted onion seedlings.

3. The onion growing method according to claim 1, wherein the step of (b) breaking the dormancy of the onions is carried out by storing the dormant onions at a temperature of 25 to 35° C. for 5 to 20 days.

4. The onion growing method according to claim 1, wherein the step of (d) growing the planted onions to produce a plurality of stems and bulbs divided from the respective onions is carried out by growing the onions for 30 to 60 days and dividing 5 to 15 onion stems and bulbs from the respective onions.

5. The onion growing method according to claim 1, wherein the step of (a) allowing onions to be dormant is carried in a state where no light exists.

6. The onion growing method according to claim 4, wherein the step of (b) breaking the dormancy of the onions is further carried out by exposing the stored dormant onions to light.

7. The onion growing method according to claim 6, wherein the light is sunlight.

8. The onion growing method according to claim 1, wherein the step of (d) growing the planted onions comprises growing the planted onions at an average daily cultivation temperature of 20° C.

9. An onion growing method comprising the steps of:
   (a) allowing onions to be dormant by storing the onions at a temperature of 0 to 5° C. in a state where no light exists;
   (b) breaking the dormancy of the onions by storing the dormant onions at a temperature of 25 to 35° C. in sunlight for 5 to 20 days;
   (c) planting the onions of which dormancy is broken in a field in such a manner as to be exposed by 1/10 to 1/2 of their height to the outside;
   (d) growing the planted onions at an average daily cultivation temperature of 20° C. to produce a plurality of stems and bulbs divided from the respective onions; and
   (e) harvesting the plurality of stems and bulbs.

10. The onion growing method according to claim 9, wherein the step of (d) growing the planted onions comprises growing the planted onions at an average daily cultivation temperature of 20° C.

* * * * *